United States Patent [19]

Deville

[11] Patent Number: 5,625,753
[45] Date of Patent: Apr. 29, 1997

[54] NEURAL PROCESSOR COMPRISING MEANS FOR NORMALIZING DATA

[75] Inventor: Yannick Deville, Villecresnes, France

[73] Assignee: U.S. Philips Corporation, New York, N.Y.

[21] Appl. No.: 55,431

[22] Filed: Apr. 29, 1993

[30] Foreign Application Priority Data

Apr. 29, 1992 [FR] France .................................. 92 05282

[51] Int. Cl.⁶ .................................................. G06F 15/18
[52] U.S. Cl. .................................. 395/27; 395/22; 395/24
[58] Field of Search ................................... 395/27, 22, 24

[56] References Cited

U.S. PATENT DOCUMENTS

| | | | |
|---|---|---|---|
| 3,733,477 | 5/1973 | Tate et al. | 364/767 |
| 3,828,175 | 8/1974 | Amdahl et al. | 364/765 |
| 4,193,115 | 3/1980 | Albus | 364/148 |
| 4,503,512 | 3/1985 | Doran | 364/761 |
| 4,725,974 | 2/1988 | Kanazawa | 364/765 |
| 4,860,241 | 8/1989 | Haber | 364/761 |
| 4,994,982 | 2/1991 | Duranton et al. | 395/27 |
| 5,130,944 | 7/1992 | Chung et al. | 364/766 |
| 5,206,828 | 4/1993 | Shah et al. | 364/784 |
| 5,272,660 | 12/1993 | Rossbach | 364/761 |

FOREIGN PATENT DOCUMENTS 2236608  4/1991  United Kingdom .

OTHER PUBLICATIONS

R.P. Lippmann, "An introduction to computing with neural nets", IEEE ASSP Magazine, Apr. 1987, pp. 4–22.

H. Hung et al., "High–Speed division unit using asymmetric neural network architecture", Electronics Letters, Mar. 1989, vol. 25, No. 5, pp. 334–345.

M. Duranton et al., "Learning on VLSI: A General Purpose Neurochip", Philips J. Res. 45, pp. 1–17, 1990.

Siu et al, "Neural Computation of Arithmetic Functions", Proc of IEEE vol. 78 No. 10, pp. 1669–1675, Oct. 1990.

*Primary Examiner*—George B. Davis
*Attorney, Agent, or Firm*—Debra K. Stephens; Anne E. Barschall

[57] ABSTRACT

A neural processor, including neural calculation apparatus (30, NQ, RQ) which normalize an input data X with respect to another input data Y. The calculation apparatus performs a division of X by Y in order to determine a quotient Q. The calculation apparatus is trained to calculate by iteration a series of contributions $\Delta Q_i$ which are used to update a partial quotient QP which becomes the quotient Q at the end of calculation. Calculation can be performed on an arbitrary arithmetic base which determines the number of neurons utilized and also the accuracy of the calculation. It is also possible to utilize a partial remainder RP.

11 Claims, 5 Drawing Sheets

NEURAL PROCESSOR COMPRISING MEANS FOR NORMALIZING DATA

FIELD OF THE INVENTION

The invention relates to a neural processor, comprising neural calculation means which normalize an input data X with respect to another input data Y by calculating a quotient Q of a division of X by Y.

Neural processors are used for classification problems, notably for the recognition of shapes, of characters, the processing of speech signals, image processing, compression of information, and other. Generally, the input data may represent physical quantities.

BACKGROUND OF THE INVENTION

Information concerning various types of neural networks can be found, for example in the article by R. P. LIPPMANN "An introduction to computing with neural nets", IEEE ASSP Magazine, April 1987, pp. 4 to 22, which is incorporated herein by reference.

For implementation of some of the above processes in a neural processor, it may be necessary to normalize data, for example as an intermediate step in successive learning stages. Advantageously, the neural processor should itself execute the normalizing step. Such step consists of the division of a batch of digital data by a factor which may be repetitive.

Independent from the execution of tasks of the neural type (resolving, learning), the neural processor may also be considered as a digital data processing device performing calculations for normalization of data.

A neural architecture for performing a division is described in the document: "High-Speed division unit using asymmetric neural network architecture" by H. HUNG and P. SIY. Electronics letters, March 1989, Vol. 25, No. 5, pp. 344–345, which is incorporated herein by reference. The cited document describes an asymmetric neural architecture which performs a cascade calculation of each bit of a quotient of two numbers, represented in a binary notation, one number being a multiple of the other. This quotient is limited to its integer part. This architecture is implemented in an analog neural processor by means of amplifiers which total sums of products of data and which apply a non-linear transfer function. Each bit of the quotient is determined successively, taking into account the preceding bits so that the calculation of the quotient may require a large number of calculation cycles.

This also implies that the neurons determining the bits of increasingly lower significance comprise a progressively increasing number of inputs. Such an operation mode cannot be transposed to a digital technology without degrading the operation.

The following additional background material is incorporated herein by reference:

1. U.S. Pat. No. 4,994,982, which shows the structure of a prior art neuron;
2. British Pat. No. GB 2,236,608 A, which also shows the structure of a prior art neuron;
3. M. Duranton et al., "Learning on VLSI: A General Purpose Neurochip", Philips J. Res. 45, 1–17, 1990 which shows a prior art neurochip and discusses fields of application.

SUMMARY OF THE INVENTION

Amongst other things, it is an object of the invention to provide a neural processor which is capable of normalizing data by calculating a quotient Q of a division of an input data X by another input data Y while utilizing only a minimum amount of hardware means operating with a reduced number of calculation cycles. It should be easy to reconfigure the calculation means for adaptation to various input data X and Y and the accuracy of calculation must be predetermined. It is desirable that the foregoing is achieved by modifying the architecture of the neural processor as little as possible.

This object is achieved by means of a neural processor for which said calculation means are trained to activate:

at least one neuron which iteratively calculates a series of contributions $\Delta Q_i = q_i \cdot B^i$ which together form an expression of the quotient Q on an arithmetic base B, and at least one neuron which iteratively updates a partial quotient QP by summing said contributions $\Delta Q_i$ in order to produce the quotient Q.

Thus, it is possible to choose the size of the base B, and hence the number of contributions $\Delta Q_i$ to be calculated and also the number of neurons, in order to obtain a faster or slower execution. Thus, a choice can be made either for a high speed using multiple hardware means or for a reduced amount of hardware means with a reduced execution speed. The operation by iteration enables a substantial reduction of the hardware.

A quotient Q can be expressed on an arbitrary base B as:

$$Q = \sum_{i=-m}^{n} q_i \cdot B^i = q_n \cdot B^n + q_{n-1} \cdot B^{n-1} \ldots + q_i \cdot B^i \ldots +$$
$$q_1 \cdot B^1 + q_0 \cdot B^0 + q_{-1} \cdot B^{-1} + \ldots q_{-m} \cdot B^{-m}$$

The choice of the base and of the value of m also enables the accuracy of the calculation to be predetermined. In order to obtain Q with an accuracy of one unit, it suffices to use only the terms from $q_n \cdot B^n$ to $q_o \cdot B^o$. The Q is then the integer part of the ratio of X to Y. The invention uses positive data X and Y. When the input data is negative, it suffices to take into account the absolute values of this data.

In accordance with the invention, all terms $q_i \cdot B^i$, $-m \leq i \leq n$, are determined successively, starting with the most-significant term $q_n \cdot B^n$. These terms are determined on the base B which may be an arbitrary base. The choice of the base B determines the manner in which the architecture of the neural processor is implemented. The size B of the base B being chosen, for the calculation of each term $q_i \cdot B^i$ each value $q_i$ is determined, and to this end several terms $j \cdot B^i$ are calculated for which the values j enclose the value $q_i$ to be determined. For a base B, the values of j are between 0 and B-1. Because the value 0 does not require calculation, these terms are determined for $1 \leq j \leq B-1$. The operation of the neural processor will thus require either at the most B-1 neurons or groups of neurons operating in parallel or at least one neuron successively operating for B-1 calculation steps. Intermediate situations may also be used. A high speed of execution is obtained by parallel operation of B-1 neurons or groups of neurons with a large size of the base B. A slower speed of execution is obtained by operating of a limited number of neurons in several consecutive steps or by choosing a smaller size for the base B.

A neural processor is in principle formed by memories storing neuron states $V_i$, memories storing synaptic coefficients $C_{ij}$, units for calculating weighted sums $\Sigma C_{ij} \cdot V_i$, and units for applying non-linear transfer functions to said weighted sums in order to produce neuron states $V_j$. The latter constitute the results of the operations executed, that is to say normalization results in the context of the present invention.

In accordance with the invention, said memories and said units are programmed by initial values, given values being permanent values and other values being regularly updated in order to execute divisions of the two input data. During each calculation cycle a partial quotient QP and possibly a partial remainder RP are determined, said values being updated. At the end of the calculation, the last partial quotient QP constitutes the final quotient Q and RP constitutes the final remainder. During each cycle, the results obtained are thus recycled for the next cycle.

In one implementation, only the partial quotient QP is used, without calculation of the partial remainder RP. In this case, the partial quotient QP initially being zero, said calculation means are trained to:

a- calculate a plurality of quantities $$SD_j = X - (QP_{i+1} + j \cdot B^i) \cdot Y,$$

said plurality resulting from a number of B−1 operations performed by at least one neuron for j varying from 1 to B−1, i being an integer number initially equal to a predetermined maximum number, b- determine a value $j=q_i$ which verifies:

$$\text{sgn}(SD_j) \neq \text{sgn}(SD_{j+1})$$

where $SD_o \geq 0$, $SD_B < 0$ and $\text{sign}(0) = +1$ c- determine a contribution $\Delta Q_i = q_i \cdot B^i$ d- determine a new partial quotient so that:

$$QP_i = QP_{i+1} + \Delta Q_i$$

e- decrement i so as to determine the quotient Q by iteration of the preceding operations until there is obtained a minimum value i which defines a predetermined accuracy for Q.

In another implementation, both the partial quotient and the partial remainder RP are used. In that case, the calculation means are trained to calculate also a partial remainder $RP_i = X - QP_i \cdot Y$, the partial remainder, initially being equal to X, being updated by iteration so that:

$$RP_i = RP_{i+1} - Y \cdot \Delta Q_i.$$

Moreover, the calculation means can calculate a plurality of quantities $SD_j = RP_{i+1} - j \cdot B^i \cdot Y.$ The B−1 operations of the step a can be performed by B−1 neurons or groups of neurons trained to operate in parallel. The B−1 operations can also be performed by a single neuron or group of neurons operating in B−1 successive calculation steps if the speed at which the result is obtained is not important.

The B−1 operations can also be distributed among groups of neurons which execute a partly parallel and a partly iterative process.

The steps a, b, and c for calculating the contributions $\Delta Q_i$ can be realised by at least a single neuron, depending on the dimension chosen for the base B.

The step d for accumulation of the successive contributions $\Delta Q_i$ may also be realised by at least a single neuron.

Using a base B of size 2, the calculation of the quotient can be performed using only two neurons.

The operations for normalization of data as described above generally occur at the end of given neural processing steps relating to resolving and/or learning phases. Therefore, neurons of the neural processor can be used to execute a normalization of data at a given instant and to execute steps of the actual neural process at another instant. Therefore, it is not necessary that the neural processor comprises neurons specifically dedicated to the normalization operations. However, the neural processor may also be used exclusively for data normalization.

The various aspects of the invention and other aspects will become apparent from and will be elucidated with reference to the embodiments described hereinafter.

BRIEF DESCRIPTION OF THE DRAWINGS

The invention will be described in detail hereinafter with reference to the accompanying drawings. Therein.

DESCRIPTION OF EMBODIMENTS

Figure 1:
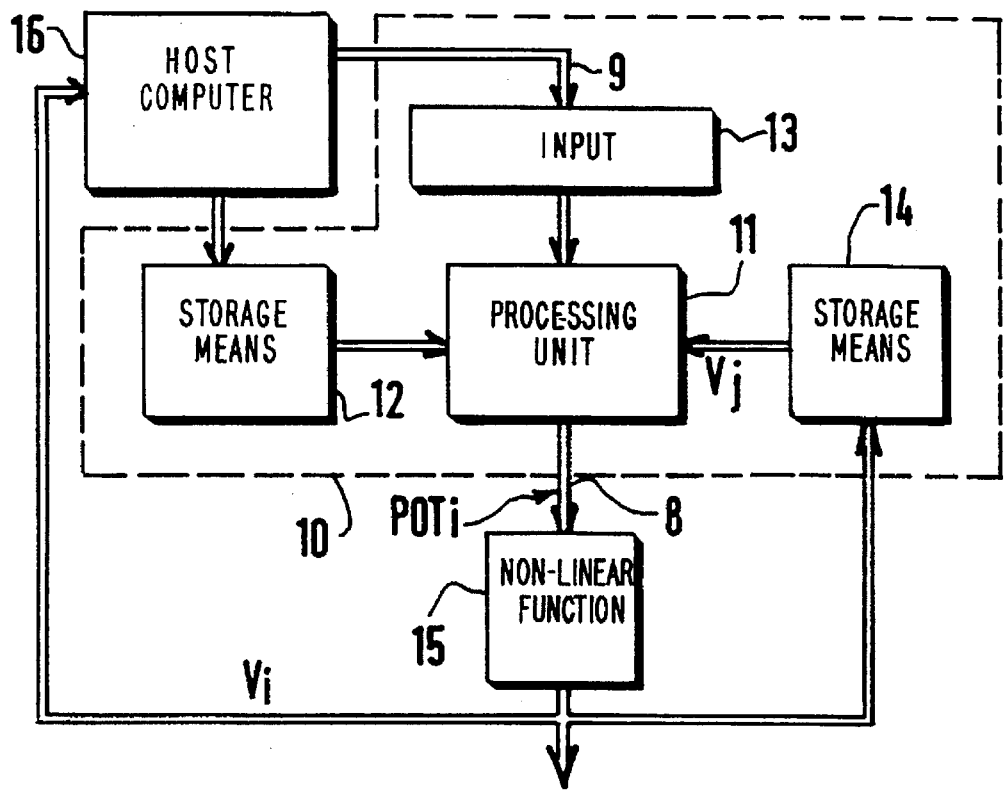
FIG. 1 shows a diagram of a known architecture of a neural processor.

FIG. 1 shows a simplified diagram of a known architecture of a neural processor 10. Input means NP 13 (for example, input registers or input terminals) apply input data 9 to a processing unit 11 which also receives synaptic coefficients $C_{ij}$ stored in storage means 12. A synaptic coefficient $C_{ij}$ characterizes the weight of the synapsis connecting a source neuron j to a destination neuron i. The processing unit 11 also receives neuron states stored in storage means 14.

When a neuron operates as a source neuron, its state is denoted as $V_j$ and when it operates as a destination neuron, its state is denoted by the reference $V_i$. For each destination neuron, the processing unit 11 executes calculations:

$$POT_i = \sum_j C_{ij} \cdot V_j$$

The processing unit 11 forms the sum for all source neurons of the index j and outputs (connection 8) the neural potential $POT_i$ of the destination neuron i. This neural potential $POT_i$ is subjected to a non-linear function NLF 15 which produces the new neuron state $V_i$ of the destination neuron i. This new state $V_i$ is used to update the storage means 14, and the process continues for other neurons. The means 15 for applying the non-linear function NLF are shown to be external of the neural processor 10. FIG. 1 merely illustrates the architecture, because these application means 15 may also be arranged within the neural processor 10. They may also concern only a part of the neurons. A host computer 16 controls the assembly of mechanisms put into operation in the neural processor. For the sake of simplicity, other parts such as control means, learning means, have been omitted.

For example, the neural processor may be used to sort, in a group of elements, the elements of different categories A, B, C. Calculated neuron states enable enumeration of these different categories. Now, in the course of given operations, for example for learning, it may be necessary to express the input data with respect to a norm. Thus, for example it may be necessary to normalize all data by ensuring that the maximum data does not exceed a maximum norm. It is thus necessary to normalize, i.e. to divide all data by the maximum data. It may also concern data originating from outside the neural processor.

The invention utilizes two types of neurons. A first type of neuron (FIG. 2-A) operates as a summing device and does not include means for applying a non-linear function F. It essentially comprises means for storing two synaptic coefficients $C_1, C_2$ which are multiplied by input values $Z_1$ and $Z_2$, respectively, in order to form products $Z_1 \cdot C_1$ and $Z_2 \cdot C_2$. These products are added in a summing device $\Sigma$ which outputs an output value Z so that $$Z = Z_1 \cdot C_1 + Z_2 \cdot C_2.$$

A second type of neuron (FIG. 2-B) operates as a test device and comprises the same elements as the first type of neuron, but also means 20 (for example, a comparator) for applying a non-linear function F. The output of the neuron thus supplies a value Z so that:

$$Z = F(Z_1 \cdot C_1 + Z_2 \cdot C_2).$$

Figure 2A:
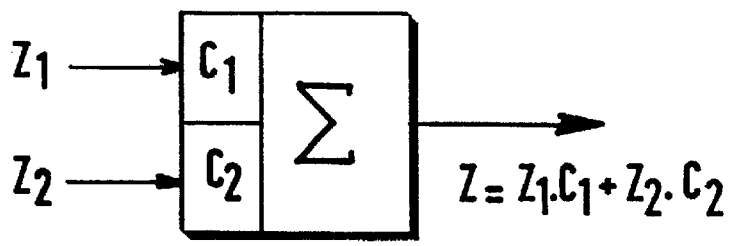
FIGS. 2A, 2B and 2C show a diagrammatic representation 2A of a neuron without a means for applying a non-linear function, a diagrammatic representation 2B of a neuron provided with a means for applying a non-linear function F, and a curve 2C which represents a non-linear function F.
Figure 2B:
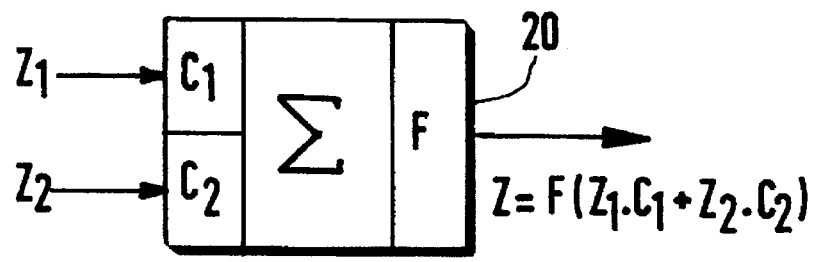
Figure 2C:
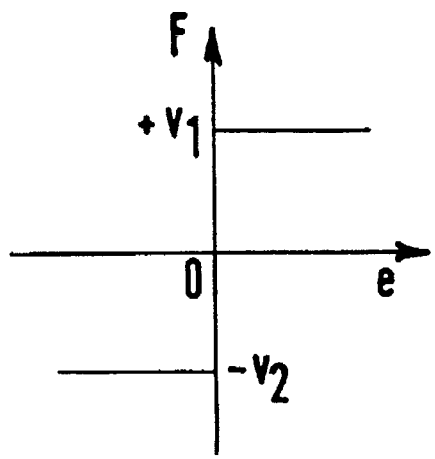

The non-linear function F is represented in FIG. 2-C. The means 20 (FIG. 2-B) comprise an input e which receives the output signal of the summing device $\Sigma$, said signal being compared with a value zero. When said input e receives on the one hand negative signals or on the other hand positive signals, the means 20 produce an output signal amounting to $-v_2$ or $+v_1$. In most embodiments to be described hereinafter, the values $+v_1/-v_2$ can be equal to 1/0, j/0, $B^i/0$.

First Implementation (First Group)

Figure 3:
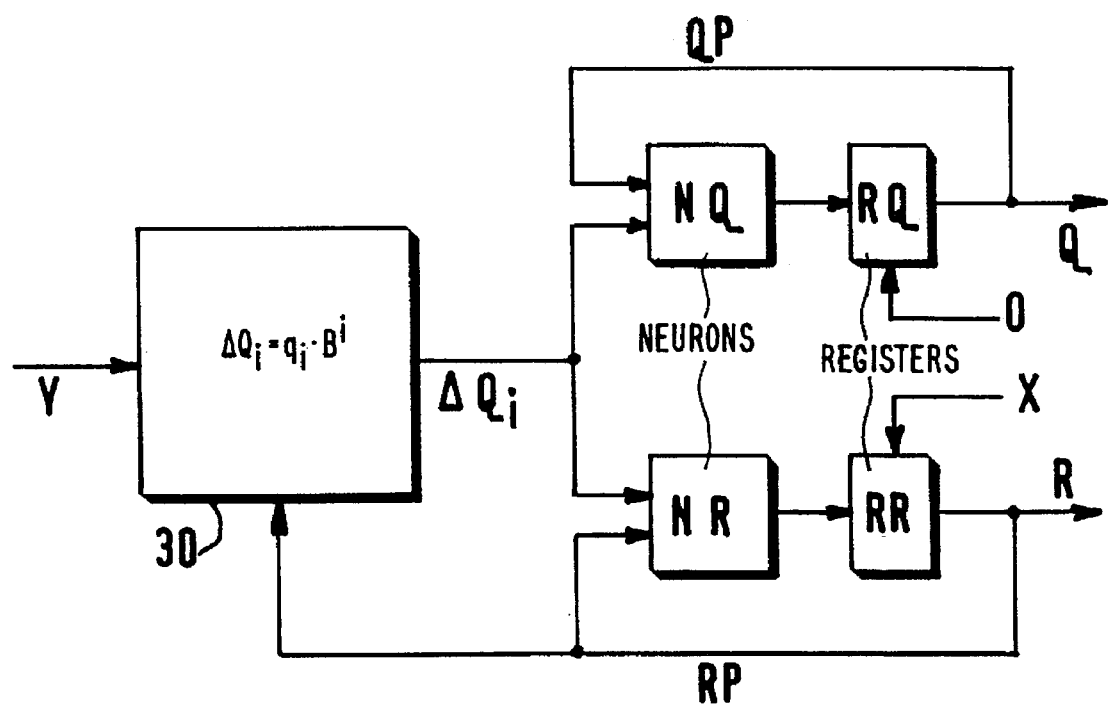
FIG. 3 shows a diagram of a first implementation of calculation means for calculating a quotient and a remainder in accordance with the invention by calculating $\Delta Q_i$ on the basis of partial remainders RP.

FIG. 3 diagrammatically shows a first implementation of calculation means trained to normalize a value X with respect to a value Y. Means 30 successively calculate the contributions $\Delta Q_i = q_i \cdot B^i$ on the basis of on the one hand the value of the data Y and on the other hand the value of a partial remainder RP. Initially, QP=0 and RP=X. Each contribution $\Delta Q_i$ serves to update RP and QP according to:

$$QP_i = QP_{i+1} + \Delta Q_i$$

and $$RP_i = RP_{i+1} - Y \cdot \Delta Q_i$$

where i is an integer which decreases from a maximum value $i_{max}$.

These updating operations utilize two neurons NQ and NR of the first type. Each neuron is coupled end-around in order to operate as an accumulator. This loop-type operation makes it necessary for each neuron NQ, NR to be followed by a register RQ, RR, respectively, which stores the result during an elementary calculation cycle. The register RQ is initialized to zero, the register RR is initialized to X and the synaptic coefficients $C_1, C_2$ of the two neurons are trained.

The values of the parameters $Z_1, C_1, Z_2, C_2$ of each of the neurons are given in Table I.

TABLE I

|    | $Z_1$ | $C_1$ | $Z_2$ | $C_2$ |
|----|-------|-------|-------|-------|
| NQ | $QP_{i+1}$ | 1 | $\Delta Q_i$ | 1 |
| NR | $RP_{i+1}$ | 1 | $\Delta Q_i$ | $-Y$ |

Determination of the Contributions $\Delta Q_i$

First Embodiment

Figure 4:
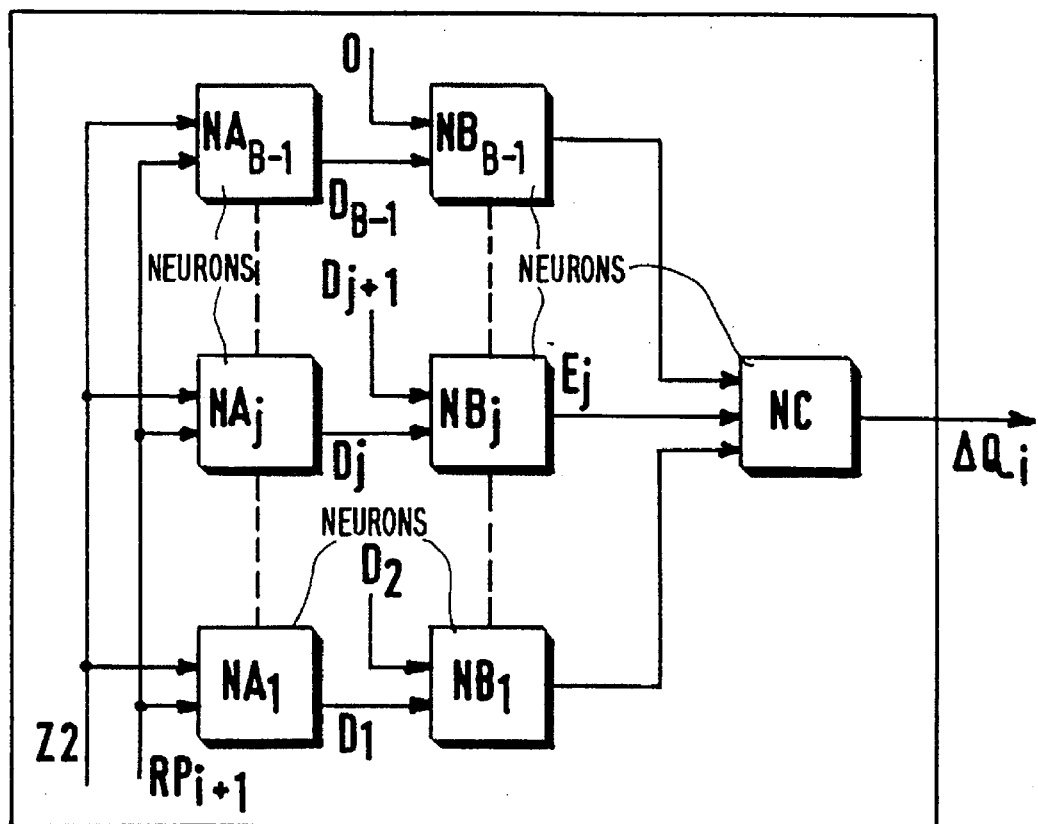
FIG. 4 shows a diagram of a first embodiment for a calculation of the contributions $\Delta Q_i$, utilizing a partial remainder RP.

FIG. 4 shows a first embodiment of the means 30 for the first group of the first implementation. The quotient Q is expressed in a base B. Preferably a layer of B−1 neurons $NA_j$ ($1 \leq j \leq B-1$) operating in parallel is used to determine, for i given, a number of B−1 terms $SD_j = RP_{i+1} - j \cdot B^i \cdot Y$, where $1 \leq j \leq B-1$. A supplementary neuron is not necessary for the calculation of the term with j=0. The neurons $NA_j$ all receive $Z_2$ and $RP_{i+1}$. They are trained so as to determine the quantities $SD_j$ whose values depend on the index j of the rank or the neuron in the layer. The terms $SD_j$ constitute the neural potentials POT of the neurons.

The determination of the term $j \cdot B^i \cdot Y$ may give rise to several combinations. The parameters $Z_1, C_1, Z_2, C_2$ of the neurons $NA_j$ may be trained in conformity with the Table II which indicates three combinations:

TABLE II

|    | $Z_1$ | $C_1$ | $Z_2$ | $C_2$ |
|----|-------|-------|-------|-------|
| $NA_j$ | $RP_{i+1}$ | 1 | Y | $-j \cdot B^i$ |
|    | $RP_{i+1}$ | 1 | $B^i$ | $-jY$ |
|    | $RP_{i+1}$ | 1 | $Y \cdot B^i$ | $-j$ |

All quantities $SD_j$ are tested so as to determine their sign and to derive therefrom the index $j=q_i$ of the smallest quantity $SD_j$ which is positive or zero. Thereto, use is made of neurons $NA_j$ of the second type, comprising a means for applying a non-linear function F to the neural potentials POT. This function F may be a function $F_1$ defined as:

$F_1(SD_j) = D_j = 1$ when $SD_j \geq 0$ $F_1(SD_j) = D_j = 0$ when $SD_j < 0$.

Thus, for $1 \leq j \leq q_i$, all outputs $D_j$ are 1 and for $q_i < j \leq B-1$ all outputs $D_j$ are 0.

A second layer of neurons $NB_j (1 \leq j \leq B-1)$ pair-wise compares the consecutive outputs $D_j$ and $D_{j+1}$. Thus, exclusively one neuron $NB_j$, having the rank $j = q_i$ has two different inputs $D_j$ and $D_{j+1}$, and has an output equal to $q_i$, the other neurons having an output zero. Therefore, the parameters $Z_1$, $C_1$, $Z_2$, $C_2$ of the neurons $NB_j$ are trained in conformity with the Table III (with $D_B=0$):

TABLE III

|      | $Z_1$ | $C_1$ | $Z_2$     | $C_2$ |
|------|-------|-------|-----------|-------|
| $NB_j$ | $D_j$ | 1     | $D_{j+1}$ | $-1$  |

In order to achieve that the outputs of the neurons $NB_j$ directly supply the index j of each neuron $NB_j$ in the layer (when $D_j \neq D_{j+1}$) use is made of neurons of the second type provided with means for applying a function $F_2$ with a response:

$E_j=0$ if $e \leq 0$
$E_j=j$ when $e>0$.

A third layer is formed by a multi-input neuron NC of the first type, each of the inputs being trained in conformity with the Table IV:

TABLE IV

|    | $Z_j$ | $C_j$ |
|----|-------|-------|
| NC | $E_j$ | $B^i$ |

In an alternative version the coefficients $C_j$ of the neuron NC may be set to the value 1 in as far as the means for applying the non-linear function F of the neurons $NB_j$ operate with a function $F_3$ so that:

$E_j=0$ when $e \leq 0$
$E_j=j \cdot B^i$ when $e>0$.

The Tables I to IV state different types of coefficients:
fixed coefficients, for example 1, −1, which are loaded at the instant at which the neural processor is used for normalization tasks in conjunction with the size of B,
coefficients, for example Y, X, which depend on data used and which are loaded for each new data X or Y,
coefficients containing terms $B^i$ which are modified during each recurrent cycle. At the start of each cycle, these coefficients, being multiples of $B^i$, are loaded, starting with the highest coefficients $B^i$, by the host computer which also controls the inputs of the corresponding neurons. The value of i is limited by a maximum value $i_{max}$ which determines the processing capacity. A neural processor can be conceived to have a fixed architecture with a given base B (so a number of B−1 neurons $NA_j$, $NB_j$) with a predetermined value $i_{max}$. It is also possible for the user to choose the dimension of the base B and the value $i_{max}$ as a function of the hardware capacity of the neural processor, thus determining the coefficients. These choices are to be made in accordance with the data values X and Y used.

For example, in the case where X and Y are integer numbers so that $0 \leq X \leq 2^r-1$ and $1 \leq Y \leq 2^r-1$, for $i_{max}$ the smallest integer can be chosen so that $2^r \leq B^{(imax+1)}$. The value $i_{max}$ then has the advantage that it does not depend on the data X and Y.

Second Embodiment

Figure 5:
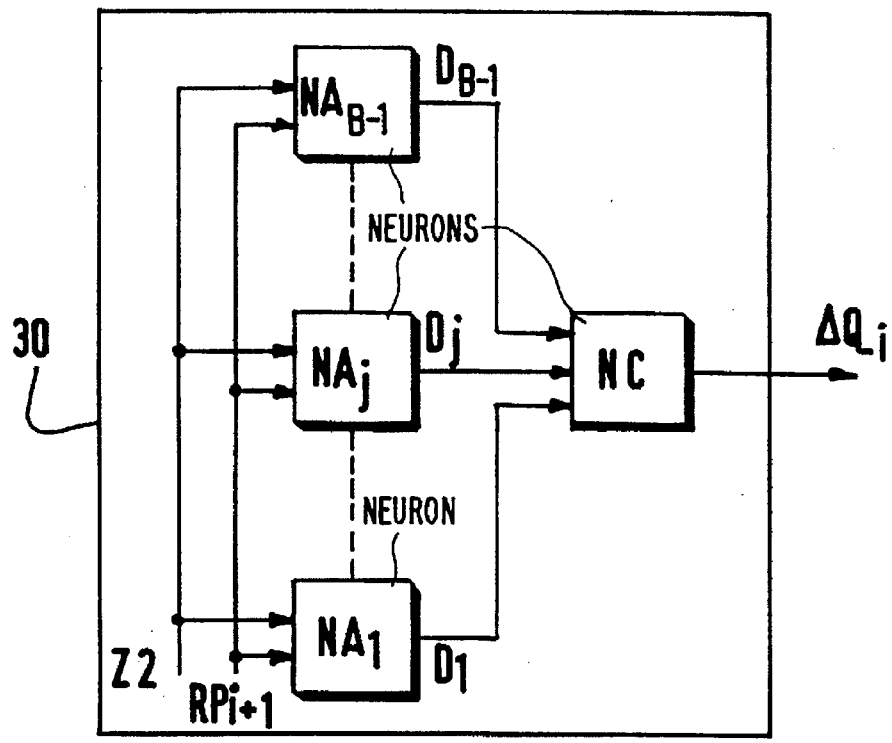
FIG. 5 shows a diagram of a second embodiment for a calculation of the contributions $\Delta Q_i$, utilizing a partial remainder RP.

Within the scope of the first implementation (first group), it may be useful to limit the number of neurons participating in the normalizing of the data. FIG. 5 shows a situation where the layer of neurons $NB_j$ is absent.

The inputs of the neurons $NA_j$ receive data corresponding to the Table II and their non-linear function is again the function $F_1$. All outputs $D_j$ are applied to a neuron NC of the first type which is trained in conformity with Table IV by substituting $D_j$ for $E_j$. The neuron NC thus sums a number $q_i$ of contributions $B^i$ corresponding to the inputs $D_j=1$.

In a version of this second embodiment, the coefficients $C_j$ of the neuron NC may be programmed to the value 1 in as far as the means for applying the non-linear function F of the neurons $NA_j$ operate with a function $F_4$ so that:

$F_4(SD_j)=D_j=B^i$ when $SD_j \geq 0$
$F_4(SD_j)=D_j=0$ when $SD_j<0$.

First Implementation (Second Group)

Within the first group, a version obtained by merging the neuron NC with on the one hand the neuron NQ and on the other hand the neuron NR corresponds to each of the described structures. This is obtained by:

omitting the neuron NC which previously received inputs $V_j$, equal to $E_j$ or $D_j$, depending on the embodiment, and which had coefficients $C_j$ equal to 1 or to $B^i$, depending on the relevant case, replacing the neuron NQ of FIG. 3 by a neuron of the first type, comprising B inputs trained in conformity with the Table V-A in which $V_j$ and $C_j$ correspond to those of the neuron NC previously used.

TABLE V-A

|            | $Z_1$      | $C_1$ | $Z_2$ to $Z_B$ | $C_2$ to $C_B$ |
|------------|-----------|-------|----------------|----------------|
| $QP_{i+1}$ |           | 1     | $V_j$          | $C_j$          | replacing the neuron NR of FIG. 3 by a neuron of the first type, comprising B inputs trained in conformity with the Table V-B (with the same significance for $V_j$ and $C_j$):

TABLE V-B

|            | $Z_1$ | $C_1$ | $Z_2$ to $Z_B$ | $C_2$ to $C_B$ |
|------------|-------|-------|----------------|----------------|
| $RP_{i+1}$ |       | 1     | $V_j$          | $-C_j \cdot Y$ |

This version comprises one layer less than before.

Second Implementation

Figure 6:
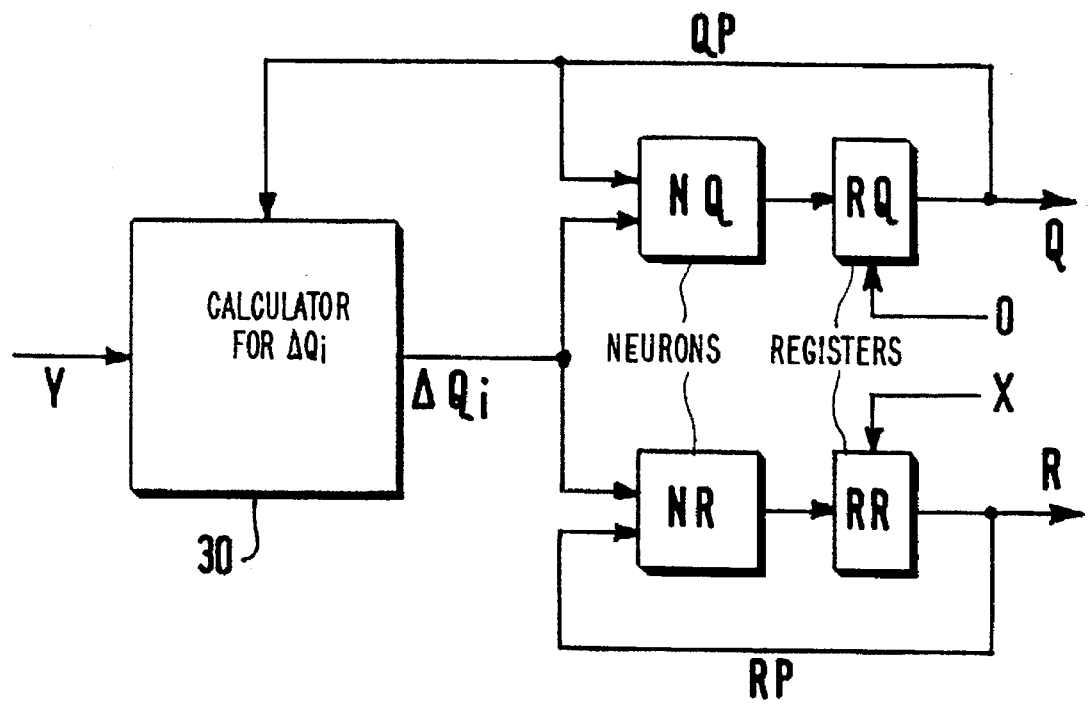
FIG. 6 shows a diagram of a second implementation of the calculation means for calculating a quotient Q and a remainder R by calculation of $\Delta Q_i$ on the basis of partial quotients QP.

FIG. 6 shows diagrammatically a second implementation. As in the first implementation, there is provided a neuron NR which supplies a final remainder at the end of calculation. However, the block 30 now utilizes the partial quotient QP for the calculation of $\Delta Q_i$. Thus, to each of the structures presented for the first implementation there corresponds a structure which is analogous thereto, except for the neurons $NA_j$ involved in the calculation of $\Delta Q_i$. The first layer of neurons involved in the calculation $\Delta Q_i$ is formed by three-input neurons $NA_j$ of the type shown in FIG. 2-B, comprising a supplementary input $Z_3$ and a synaptic coefficient $C_3$. The Table VI states the parameters $Z_1$, $C_1$, $Z_2$, $C_2$, $Z_3$, $C_3$ of the neurons $NA_j$.

TABLE VI

|        | $Z_1$ | $C_1$ | $Z_2$         | $C_2$   | $Z_3$      | $C_3$ |
|--------|-------|-------|---------------|---------|------------|-------|
| $NA_j$ | X     | 1     | Y             | $-jB^i$ | $QP_{i+1}$ | $-Y$  |
|        | X     | 1     | $B^i$         | $-jY$   | $QP_{i+1}$ | $-Y$  |
|        | X     | 1     | $Y \cdot B^i$ | $-j$    | $QP_{i+1}$ | $-Y$  |

For the determination of $\Delta Q_i$, use is preferably made of the structure described for the second embodiment presented for the first implementation.

Third Implementation

The third implementation corresponds to the case where the neuron NR is not used and where the only result supplied by the structure is the final quotient (i.e. the final remainder is not supplied). This allows to omit the calculation of RP. The structures of this third implementation are identical to those of the second implementation, except that they do not contain the neuron NR and the register RR.

$\Delta Q_i$ is preferably determined by a structure which is analogous to that of FIG. 5 and which is deduced therefrom for its application in the second implementation.

Moreover, it is advantageous to use the second group described in which the neuron NC is merged with the neuron NQ, because then two advantages are obtained:

- as before, one layer m the structure is omitted,
- it is not necessary to duplicate the calculation of $\Delta Q_i$, because NR does not exist.

Specific Implementation for B=2

Figure 7:
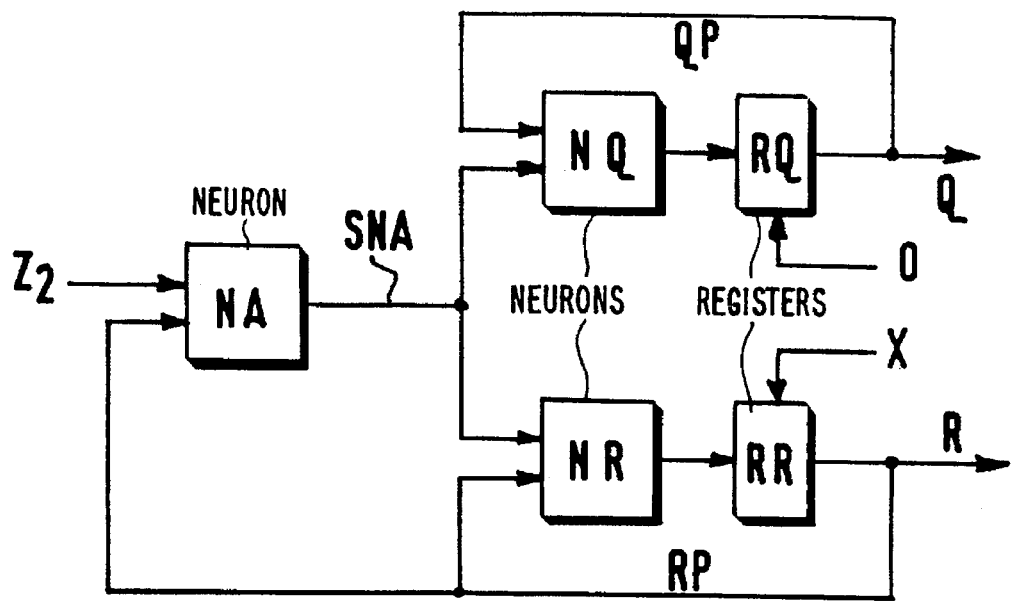
FIG. 7 shows a diagram of an implementation with three neurons for a calculation of a quotient Q and a remainder R when the base B has a dimension 2.

A case which is interesting because of the simplicity of the hardware means used is the case where the base B has a dimension 2. In this case, the determination of the values $q_i$ requires only a single neuron. FIG. 7 shows an embodiment which utilizes determination of partial quotients QP and partial remainders RP. Three neurons NA, NR, NQ suffice to determine the quotient Q and the remainder R. The output SNA of the neuron NA supplies either the values $q_i$ or the contributions $q_i \cdot B^i$, depending on the non-linear functions used. The neurons NQ and NR are of the first type and are followed by storage registers RQ and RR, respectively. The parameters Z, C of the neuron NA (second type) are learned in conformity with the Table II, with j=1. The non-linear function F applied to the data supplied by the summing device of NA may be applied as before in conformity with the functions $F_1$ or $F_4$. In the case of the function $F_4$, the parameters Z, C of the neurons NQ and NR may be learned in conformity with the Table I by replacing $\Delta Q_i$ by SNA. In the case of the function $F_1$, the parameters Z, C of the neurons NQ and NR may be learned in conformity with the Table VII.

TABLE VII

|    | $Z_1$      | $C_1$ | $Z_2$ | $C_2$        |
|----|------------|-------|-------|--------------|
| NQ | $QP_{i+1}$ | 1     | SNA   | $2^i$        |
| NR | $RP_{i+1}$ | 1     | SNA   | $-2^i \cdot Y$ |

Figure 8:
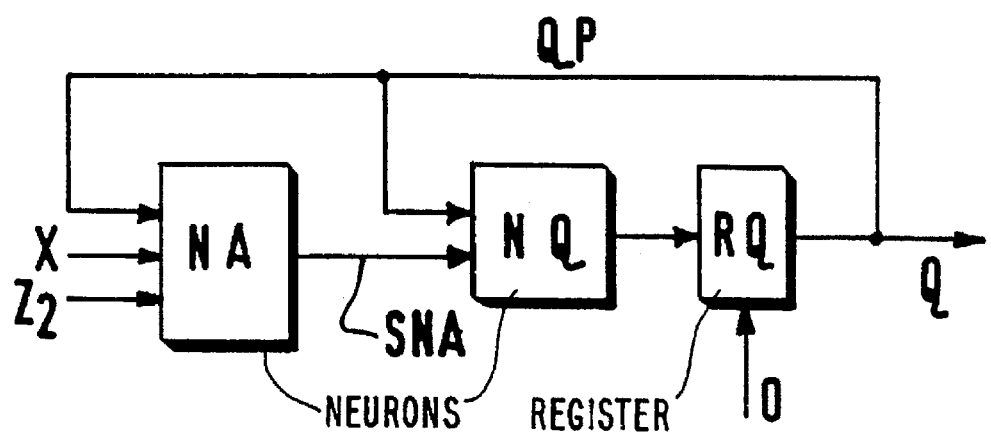
FIG. 8 shows a diagram of an implementation with two neurons for a calculation of a quotient Q in the case where the base B has a dimension 2.

For B=2, it is also possible, in conformity with FIG. 8, to reduce the hardware to two neurons only. In that case no partial remainders are determined. The parameters of the neuron NA are the same as those of the Table VI, with j=1. The parameters of the neuron NQ and the function F are the same as those of the implementation for B=2.

Case where $B=2^k$

Figure 9:
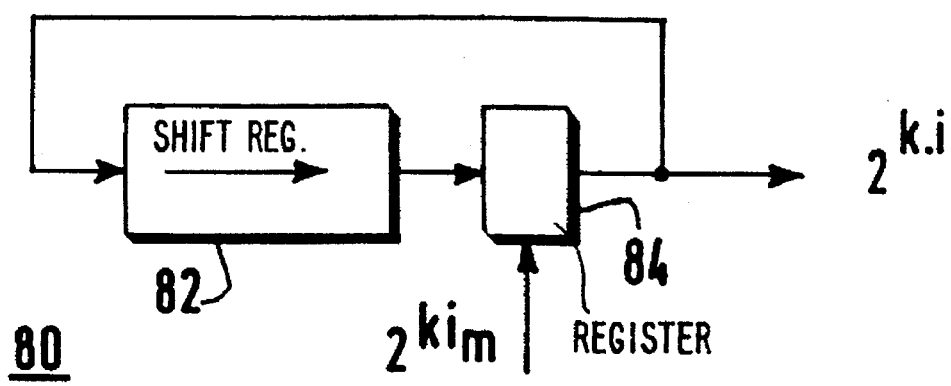
FIG. 9 shows a diagram of a unit for calculating terms of the type $2^{ki}$ in the case where the base B has a dimension of the type $2^k$.

When the dimension of the base can be written as $B=2^k$, where k is an integer, use can be made of a unit which iteratively calculates given values involving values $B^i$. This is the case, for example for the values $\pm j \cdot B^i$ and $\pm Y \cdot B^i$. FIG. 9 shows such a module 80 which comprises a k-position shift register 82 which is followed by a register 84 which can be initialized at a value $2^{k \cdot imax}$. The output of the register 84 supplies coefficients $B^i=2^{k \cdot i}$ which are also applied to the input of the shift register 82. By shifting the input data through each time k positions, division by a factor $2^k$ is possible, so that the successive coefficients $B^i$ can all be calculated in order to implement the described methods. This module 80 can be used for determining parameters Z and/or C.

Overflows

The neural processor must store different parameters Z, C, different input data X, Y, and results QP, RP. To this end, the neural processor has a processing capacity which depends on the maximum capacities of registers and memories.

Generally, if the capacity of the neuron state registers and the synaptic coefficient memories allows for the storage of signed words of (r+1) bits, it is possible to process, for example data X and Y such that $0 \leq X \leq 2^r-1$ and $1 \leq Y \leq 2^r-1$, where X and Y are integers. Nevertheless, the intermediate calculations utilize terms $j \cdot B^i Y$ which can be calculated in various ways, such as those indicated in Table II. Depending on the structure considered, it may occur that when no restriction is imposed with respect to the values of the parameters r, B, Y, given intermediate calculations used for the calculation of $j \cdot B^i Y$ by the neurons NA may require words having more than (r+1) bits. Several solutions to this potential problem can be proposed:

1) Abstaining from imposing restrictions with respect to the parameters r, B, Y (except $1 \leq Y \leq 2^r-1$) and, therefore, choosing the length of internal registers in dependence on the relevant embodiment.

2) Imposing a length of (r+1) bits on all registers and imposing restrictions in respect of the parameters r, B, Y in accordance with the available hardware means and the programming modes chosen in the Table II. Restrictions as described below suffice to avoid any problem:

imposing that B is a power of 2, $B=2^k$ and r is a multiple of k. Notably no overflow problem occurs if B=2 and r is arbitrary, or imposing a limit $Y_{max}$ on Y, where $Y_{max}$ is a value chosen so that all quantities involved in the calculation of $j \cdot B^i Y$ (for example, $Z_2=Y \cdot B^i$ or $C_2=-jY$ in the Table II) can be stored in registers with (r+1) bits.

3) Imposing a length of (r+1) bits on all registers while abstaining from imposing restrictions to parameters r, B, Y, and choosing specific values for the coefficients. Let it be assumed that the storage capacity of each register is (r+1) bits. The storage of $RP_{i+1}$ does not cause an overflow for a correctly studied system. However, the calculation of terms $SD_j = RP_{i+1} - j \cdot B^i Y$ may cause overflow for given values of j and/or i, leading to negative terms $SD_i$. Next, only detecting a negative sign for $SD_j$ suffices. This is achieved by learning, in Table II, the coefficients $C_1=0$ and $C_2=-1$ for the values j and i which would lead to an overflow. This learning is controlled by the host computer.

Those skilled in the art will then choose one of the learning modes given, for example in the Tables II or VI, and one of the solutions to the overflow problems as a function of the length of the registers and memories available in the neural processors, the data to be processed and the desired performance.

The invention may be used for the processing of data X and Y as integers or real numbers.

The various implementations derive their importance from the effective use of the processor, and differing in that:

- the number of neurons is larger or smaller,
- supplementary inputs Z, for example equal to $B^i$ or to a multiple of this value, are required or not,
- the synaptic coefficients are fixed or variable in the course of one or several divisions,
- the transfer functions of the comparators are fixed or variable in the course of a division,
- external or internal operational variables appear as neuron states or as synaptic coefficients and if the respective registers do not have the same length, the maximum acceptable values for these variables are higher or lower, which means that overflow problems must be dealt with in different ways.

I claim:

1. A neural processor comprising neural calculation means (11–15) for normalizing first input data X with respect to second input data Y by calculating a quotient q of a division of X by Y, said neural calculation means including:

at least one first neuron for recursively calculating a series of contributions $\Delta Q_i = q_i \cdot B^i$ which together form the quotient Q on an arbitrary arithmetic base B, where q and i are integers; and at least one second neuron fed by said at least one first neuron for recursively updating a partial quotient QP by summing said contributions $\Delta Q_i$ in order to produce the quotient Q.

2. The neural processor of claim 1, wherein the partial quotient QP is initially zero, and said processor performs the following operations:

calculating a plurality of quantities $SD_j$ according to the following equation:

$$SD_j = X - (QP_{i+1} + j \cdot B^i) \cdot Y$$

said plurality of quantities resulting from B−1 operations performed by at least one neuron for an index j varying from 1 to B−1, i being an integer index initially equal to a predetermined maximum number;

first determining a value $j = q_i$ for which:

$$\mathrm{sgn}(SD_j) \neq \mathrm{sgn}(SD_{j+1})$$

where $SD_0 \geq 0$, $SD_B < 0$, and $\mathrm{sgn}(0) = +1$;

second determining a contribution $\Delta Q_i = q_i \cdot B^i$;

third determining a new partial quotient such that:

$$QP_i = QP_{i+1} + \Delta Q_i;$$

and decrementing i;

iterating through the operations until a minimum value of i is reached so as to determine the quotient Q to a predetermined accuracy.

3. The neural processor of claim 2, wherein the neural calculation means further calculates a partial remainder $RP_i = X - QP_i \cdot Y$ by performing the following additional operations:

setting the partial remainder initially to X; and updating the partial remainder by iteration so that:

$$RP_i = RP_{i+1} - Y \cdot \Delta Q_i$$

where i is an integer index which is initialized to a maximum value and decremented to a predetermined minimum value which yields a desired precision for Q.

4. The neural processor of claim 3, wherein the neural calculation means further calculates a plurality of quantities $SD_j$ according to the following equation:

$$SD_j = RP_{i+1} - j \cdot B^i \cdot Y.$$

where j is an integer index varying from 1 to B−1.

5. The neural processor of claim 3, wherein for B=2, the neural processor operates with three neurons, a first neuron executing the calculating operations, first determining operations and second determining operations and a second neuron (NQ) and a third neuron (NR) executing the updating of the partial quotient and the partial remainder, respectively.

6. The neural processor of claim 2, wherein the second and third determining operations are executed by at least one neuron.

7. The neural processor of claim 2, wherein for B=2, the neural processor operates with two neurons, a first neuron executing the calculating operations, first determining operations, and second determining operations and a second neuron executing the third determining operation.

8. The neural processor of claim 1, wherein the execution of the B−1 operations is distributed between several groups of at least one neuron each.

9. The neural processor of claim 1, wherein the neural calculation means further performs a division at one instant and performs neural resolving and/or learning tasks at another instant.

10. A neural processor comprising neural calculation means for normalizing first input data X with respect to a second input data Y by calculating a quotient Q of a division of X by Y, said calculation means comprising:

a first neuron:

calculating a quantity $SD_1$ according to the following equation:

$$SD_1 = X - (QP_{i+1} + 2^i) \cdot Y$$

where i is an index initially set to a maximum value, and $QP_1$ is a partial quotient which is initially zero; and first determining a value $q_i = j$ for which $$\mathrm{sgn}(SD_j) \neq \mathrm{sgn}(SD_{j+1})$$

where $0 \leq j \leq 1$, $SD_0 \geq 0$, $SD_2 < 0$, and $\mathrm{sgn}(0) = +1$; and a second neuron second determining a contribution $\Delta Q = q_i \cdot 2^i$; and third determining a new partial quotient $QP_i$ such that $$QP_i = QP_{i+1} + \Delta Q_i$$

the processor then decrementing i and iterating through the operations so as to determine the quotient Q to a predetermined accuracy.

11. The neural processor of claim 10 comprising at least one third neuron for calculating a partial remainder $RP_i = X - QP_i \cdot Y$, the partial remainder, initially being equal to X, being updated by iteration so that $$RP_i = RP_{i+1} - Y \cdot \Delta Q_i.$$

* * * * *